US006710948B2

United States Patent
Harada (10) Patent No.: US 6,710,948 B2
(45) Date of Patent: Mar. 23, 2004

(54) OPTICAL PICKUP (75) Inventor: Suehiro Harada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/406,437

(22) Filed: Apr. 4, 2003

(65) Prior Publication Data

US 2003/0197960 A1 Oct. 23, 2003

(30) Foreign Application Priority Data

Apr. 17, 2002 (JP) ..................... P2002-114320

(51) Int. Cl.[7] .................. G02B 7/02
(52) U.S. Cl. ............. 359/822; 359/819
(58) Field of Search ............. 359/719, 811, 359/813, 819, 822

(56) References Cited

U.S. PATENT DOCUMENTS 6,178,155 B1 * 1/2001 Ueda et al. ............. 369/244
2002/0067552 A1 * 6/2002 Tanabe et al. ............. 359/699

FOREIGN PATENT DOCUMENTS

JP 10-162372 6/1998

* cited by examiner

Primary Examiner—Jordan M. Schwartz
Assistant Examiner—Jessica Stultz
(74) Attorney, Agent, or Firm—Morgan, Lewis & Bockius LLP (57) ABSTRACT In an optical pickup, an actuator base of an objective lens unit is attached to an end face of a housing by a reference bolt and two tilt adjusting bolts which are respectively inserted in through holes of the housing. A tapered conical spring is used which has one end portion whose outside diameter is set to be identical to or slightly smaller than the diameter of a bottom surface of a recessed portion and another end portion whose outside diameter is set to be identical to or slightly smaller than the diameter of a head of the reference bolt. The one end portion of the tapered conical spring is made to abut against the bottom surface of the recessed portion, while the other end portion of the tapered conical spring is made to abut against the head of the reference bolt.

8 Claims, 5 Drawing Sheets

OPTICAL PICKUP

The present disclosure relates to the subject matter contained in Japanese Patent Application No. 2002-114320 filed Apr. 17, 2002, which is incorporated herein by reference in its entirety.

BACKGROUND OF THE INVENTION

1. Field of the Invention

The present invention relates to an optical pickup that makes it possible to effect the tilt adjustment of an objective lens easily with an inexpensive structure.

2. Description of the Related Art

As techniques concerning optical pickups, those including one disclosed in JP-A-10-162372 are known. To describe one such example with reference to FIGS. 7 to 9, an optical pickup 2 is movably arranged on a pair of guide rails 1 laid along the radial direction of a disk D. A rack 4 is formed integrally with a synthetic resin-made housing 3 of the optical pickup 2. A pinion 6, which is forwardly and reversely rotated by a feed motor (not shown) by a gear 5, meshes with the rack 4. As the feed motor is forwardly or reversely rotated, the optical pickup 2 can be moved in back-and-forth directions a and b along the guide rails 1 by means of the gear 5, the pinion 6, and the rack 4.

Figure 7:
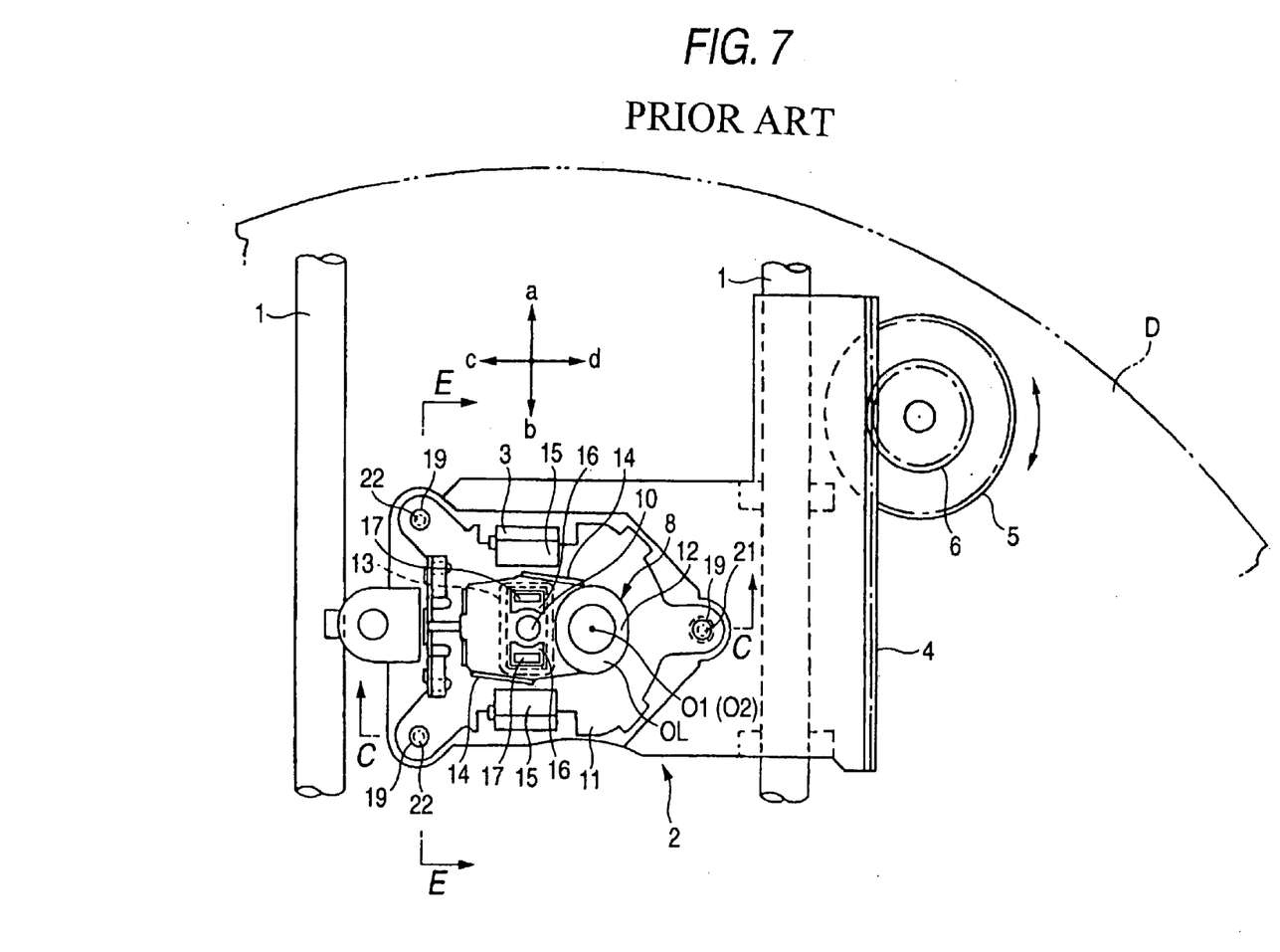
FIG. 7 is a plan view of a conventional optical pickup.
Figure 8:
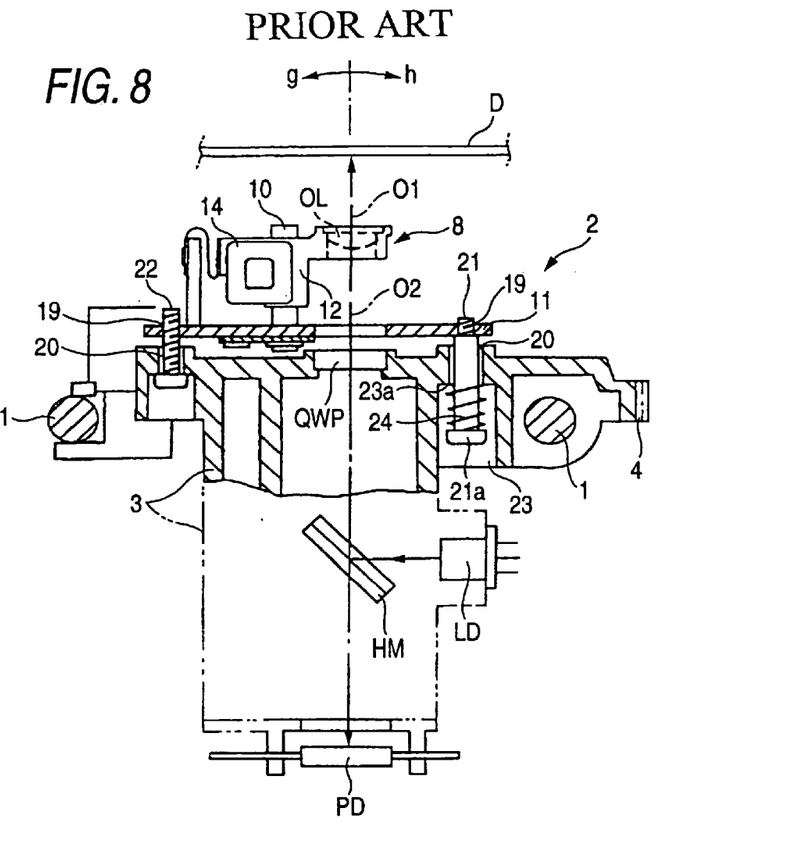
FIG. 8 is a view taken in the direction of arrows along line C—C of FIG. 7.
Figure 9:
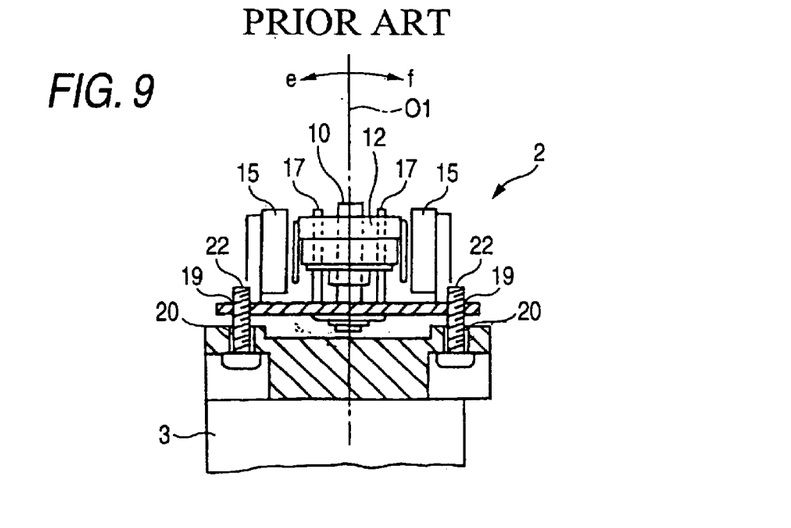
FIG. 9 is a view taken in the direction of arrows along line E—E of FIG. 7.

An objective lens unit 8 and a collimator lens QWP are provided on one end side of the housing 3, while a light receiving element PD constituted by a photodiode IC is provided at the other end side of the housing 3. A half mirror HM and a semiconductor laser LD are disposed in the housing 3. Laser light is projected from the semiconductor laser LD onto the disk D through the half mirror HM, the collimator lens QWP, and an objective lens OL of the objective lens unit 8. The reflected light is received by the light receiving element PD, and information recorded on the disk D is read on the basis of a received light signal thereof.

The objective lens unit 8 includes an actuator base 11 having a shaft 10 provided uprightly in its center; a lens holder 12 for supporting the objective lens OL, the lens holder 12 is fitted to the shaft 10 slidably and oscillatably; a focusing coil 13 and a pair of tracking coils 14 attached to the lens holder 12; a pair of magnets 15 secured to both side portions of the actuator base 11 with the lens holder 12 located therebetween; and a pair of yokes 17 rising up from the actuator base 11 and respectively inserted in a pair of through holes 16 of the lens holder 12. As the focusing coil 13 is energized to cause the lens holder 12 to slide along the shaft 10 in a focusing direction, the focus of the objective lens OL is adjusted to the disk D. As the tracking coils 14 are energized to cause the lens holder 12 to oscillate about the shaft 10 in a tracking direction, a predetermined track of the disk D is followed.

Three threaded holes 19 are formed in the actuator base 11 at predetermined intervals, while three through holes 20 are bored in the housing 3 in such a manner as to oppose these threaded holes 19. One reference bolt 21 and two tilt adjusting bolts 22 are respectively inserted in these through holes 20. A small-diameter portion at the tip of the reference bolt 21 and the tilt adjusting bolts 22 are screwed into the threaded holes 19. A recessed portion 23, which is concentric with the through hole 20 for the reference bolt 21, is formed in the housing 3. A cylindrical spring 24 is interposed between a bottom surface 23a of the recessed portion 23 and a head 21a of the reference bolt 21. The actuator base 11 is pulled toward an end face side of the housing 3 by the cylindrical spring 24 by means of the reference bolt 21.

In the above-described construction, in the process of the adjustment of the optical axis prior to shipment from a factory, the actuator base 11 is moved in the back-and-forth directions a and b and in left-and-right directions c and d to horizontally move an optical axis O1 of the objective lens OL. Meanwhile, the amount of screwing-in of each tilt adjusting bolt 22 is adjusted to tilt the optical axis O1 of the objective lens OL in radial directions e and f and in tangential directions g and h. Thus the optical axis O1 of the objective lens OL is precisely aligned with an optical axis O2 of the laser light.

In the above-described conventional construction, since the housing 3 is formed of a synthetic resin, the end of the cylindrical spring 24 can possibly bite into the bottom surface 23a of the recessed portion 23. As a result, there are cases where the cylindrical spring 24 constitutes a hindrance to the movement of the reference bolt 21, and the horizontal movement and tilting of the actuator base 11 is hindered, thereby making the tilt adjustment of the objective lens OL difficult.

Figure 10A:
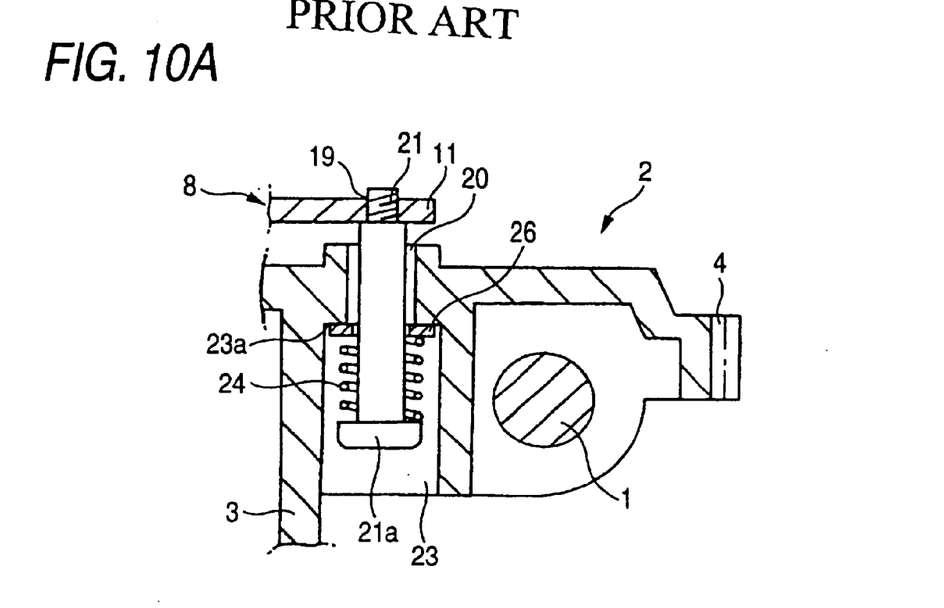
FIG. 10A is a vertical cross-sectional view partially illustrating a conventional example.
Figure 10B:
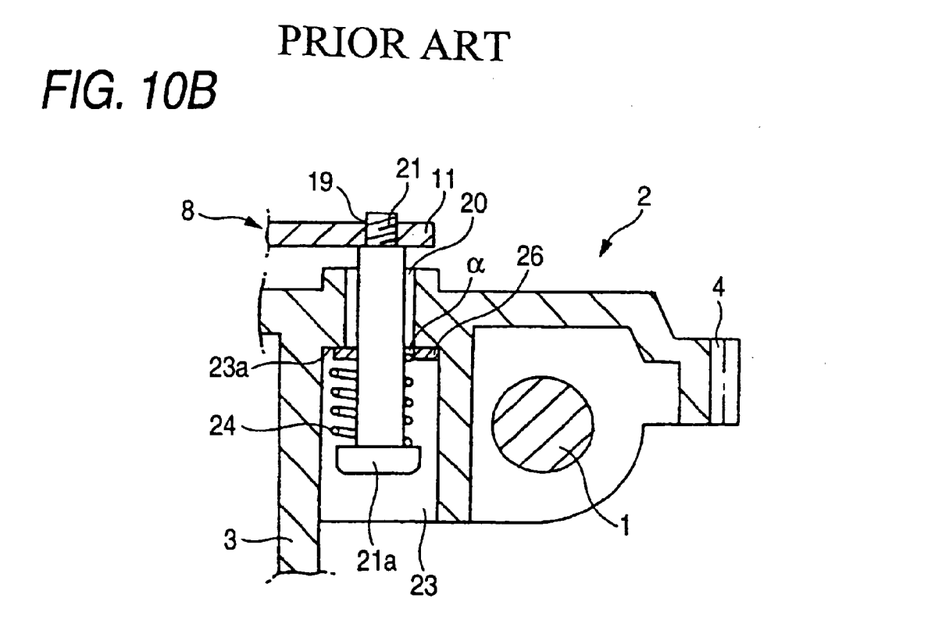
FIG. 10B is a vertical cross-sectional view illustrating a drawback of the conventional example.

Accordingly, as shown in FIG. 10A, a washer 26 is interposed between the bottom surface 23a of the recessed portion 23 and the cylindrical spring 24. According to this arrangement, the end of the cylindrical spring 24 can easily slide on the washer 26, facilitating the movement of the actuator base 11. On the other hand, however, the number of parts increases by the washer 26 and the fabrication cost increases. Also, in a case where the washer 26 has slid on the bottom surface 23a in a direction opposite to the sliding direction of the cylindrical spring 24, there are cases where the end of the cylindrical spring 24 is fitted in a gap α between the inner peripheral wall of the washer 26 and the peripheral wall of the reference bolt 21. As a result, there are cases where the cylindrical spring 24 constitutes a hindrance to the movement of the reference bolt 21, and the horizontal movement and tilting of the actuator base 11 is hindered, thereby making the tilt adjustment of the objective lens OL difficult.

SUMMARY OF THE INVENTION

In view of the drawbacks of the above-described conventional art, the object of the invention is to provide an optical pickup that makes it possible to effect the tilt adjust of the objective lens easily with an inexpensive structure.

To attain the above object, in accordance with a first aspect of the invention, there is provided an optical pickup comprising: a housing having a through hole for reference bolt, a recessed portion formed concentric with the through hole for reference bolt and through holes for tilt adjusting bolt; a reference bolt to be inserted in the through hole for reference bolt, the reference bolt having a head; two tilt adjusting bolts to be inserted in the through holes for tilt adjusting bolt; an actuator base attached to an end face of the housing by the reference bolt and the tilt adjusting bolts; a lens holder holding an objective lens, the lens holder is supported on the actuator base; and a tapered conical spring interposed between the recessed portion and the head of the reference bolt, the tapered conical spring having one end portion whose outside diameter is set to be identical to or slightly smaller than a diameter of a bottom surface of the recessed portion and another end portion whose outside diameter is set to be smaller than the outside diameter of the one end portion and identical to or slightly smaller than a diameter of the head of the reference bolt, wherein the one end portion of the tapered conical spring is made to abut against the bottom surface of the recessed portion without abutting against a washer, while the other end portion of the tapered conical spring is made to abut against the head of the reference bolt, thereby urging the actuator base toward the end face of the housing, and each of the tilt adjusting bolts is operated against a spring force of the tapered conical spring so as to align an optical axis of the objective lens with an optical axis of laser light.

According to the above-described construction, even if the one end portion of the conical spring interposed between the bottom surface of the recessed portion and the head of the reference bolt bites into the bottom surface, since the one end portion of the conical spring is formed in the large-diameter shape, the conical spring is deflected appropriately and allows the movement of the reference bolt. Hence, the horizontal movement and tilting of the actuator base is not hindered, and the tilt adjustment of an objective lens can be effected easily. In addition, since the washer is omitted between the bottom surface of the recessed portion and the head of the conical spring, the fabrication cost can be lowered by the omitted portion.

In addition, since the conical spring is formed in the tapered shape, and the conical spring is resiliently deformed uniformly as a whole to return the reference bolt to its central portion, the actuator base can be horizontally moved and tilted smoothly.

Furthermore, since the outside diameter of the one end portion of the conical spring is set to be identical to or slightly smaller than the diameter of the bottom surface of the recessed portion, the one end portion of the conical spring is prevented from being fitted in the gap between the inner peripheral wall defining a through hole of the housing and the peripheral wall of the reference bolt. Therefore, the actuator base can be horizontally moved and tilted smoothly, and the tilt adjustment of the objective lens can be effected precisely. Moreover, since the outside diameter of the other end portion of the conical spring is set to be identical to or slightly smaller than the diameter of the head of the reference bolt, the conical spring can be reliably compressed by the head of the reference bolt, making it possible to generate a tensile force, as desired.

Since the outside diameter of the one end portion of the conical spring is set to be identical to or slightly smaller than the diameter of the bottom surface of the recessed portion and the outside diameter of the other end portion of the conical spring is set to be identical to or slightly smaller than the diameter of the head of the reference bolt, the center of the reference bolt is aligned with the center of the conical spring.

In accordance with a second aspect of the invention, there is provided an optical pickup comprising: a housing having a through hole for reference bolt, a recessed portion formed concentric with the through hole for reference bolt and through holes for tilt adjusting bolt; a reference bolt to be inserted in the through hole for reference bolt, the reference bolt having a head; two tilt adjusting bolts to be inserted in the through holes for tilt adjusting bolt; an actuator base attached to an end face of the housing by the reference bolt and the tilt adjusting bolts; a lens holder holding an objective lens, the lens holder is supported on the actuator base; and a conical spring interposed between the recessed portion and the head of the reference bolt, the conical spring having one end portion whose outside diameter is set to be identical to or slightly smaller than a diameter of a bottom surface of the recessed portion and a remaining portion whose outside diameter is set to be smaller than the outside diameter of the one end portion and identical to or slightly smaller than a diameter of the head of the reference bolt, wherein the one end portion of the conical spring is made to abut against the bottom surface of the recessed portion instead of abutting against a washer, while the other end portion of the conical spring is made to abut against the head of the reference bolt, thereby urging the actuator base toward the end face of the housing, and each of the tilt adjusting bolts is operated against a spring force of the tapered conical spring so as to align an optical axis of the objective lens with an optical axis of laser light.

According to the above-described construction, even if the one end portion of the conical spring interposed between the bottom surface of the recessed portion and the head of the reference bolt bites into the bottom surface, since the one end portion of the conical spring is formed in the large-diameter shape, the conical spring is deflected appropriately and allows the movement of the reference bolt. Hence, the horizontal movement and tilting of the actuator base is not hindered, and the tilt adjustment of an objective lens can be effected easily. In addition, since the washer is omitted between the bottom surface of the recessed portion and the head of the conical spring, the fabrication cost can be lowered by the omitted portion.

In addition, since the remaining portion other than the one end portion of the conical spring is formed in the cylindrical shape of the same diameter, that cylindrical portion can be compressed uniformly to reliably position the actuator base resiliently.

Furthermore, since the outside diameter of the one end portion of the conical spring is set to be identical to or slightly smaller than the diameter of the bottom surface of the recessed portion, the one end portion of the conical spring is prevented from being fitted in the gap between the inner peripheral wall defining the through hole of the housing and the peripheral wall of the reference bolt. Therefore, the actuator base can be horizontally moved and tilted smoothly, and the tilt adjustment of the objective lens can be effected precisely. Moreover, since the outside diameter of the remaining portion other than the one end portion of the conical spring is set to be identical to or slightly smaller than the diameter of the head of the reference bolt, the conical spring can be reliably compressed by the head of the reference bolt, making it possible to generate a tensile force, as desired.

Since the outside diameter of the one end portion of the conical spring is set to be identical to or slightly smaller than the diameter of the bottom surface of the recessed portion and the outside diameter of the other end portion of the conical spring is set to be identical to or slightly smaller than the diameter of the head of the reference bolt, the center of the reference bolt is aligned with the center of the conical spring.

In accordance with a third aspect of the invention, there is provided an optical pickup comprising: a housing having a through hole for reference bolt, a recessed portion formed concentric with the through hole for reference bolt and through holes for tilt adjusting bolt; a reference bolt to be inserted in the through hole for reference bolt, the reference bolt having a head; two tilt adjusting bolts to be inserted in the through holes for tilt adjusting bolt; an actuator base attached to an end face of the housing by the reference bolt and the tilt adjusting bolts; a lens holder holding an objective lens, the lens holder is supported on the actuator base; and a conical spring interposed between the recessed portion and the head of the reference bolt, wherein one end portion of the conical spring having a large diameter is made to abut against a bottom surface of the recessed portion, while the other end portion of the conical spring having a small diameter is made to abut against the head of the reference bolt, thereby urging the actuator base toward the end face of the housing, and each of the tilt adjusting bolts is operated against a spring force of the conical spring so as to align an optical axis of the objective lens with an optical axis of laser light.

According to the above-described construction, even if the one end portion of the conical spring interposed between the bottom surface of the recessed portion and the head of the reference bolt bites into the bottom surface, since the one end portion of the conical spring is formed in the large-diameter shape, the conical spring is deflected appropriately and allows the movement of the reference bolt. Hence, the horizontal movement and tilting of the actuator base is not hindered, and the tilt adjustment of an objective lens can be effected easily. In addition, since the washer is omitted between the bottom surface of the recessed portion and the head of the conical spring, the fabrication cost can be lowered by the omitted portion.

In the invention according to the third aspect, the conical spring may be formed in a tapered shape, and the one end portion of the tapered conical spring is made to abut against the bottom surface of the recessed portion, while the other end portion of the tapered conical spring is made to abut against the head of the reference bolt.

According to the above-described construction, since the conical spring is formed in the tapered shape, and the conical spring is resiliently deformed uniformly as a whole to return the reference bolt to its central portion, the actuator base can be horizontally moved and tilted smoothly.

In the invention according to the third aspect, the conical spring may have a cylindrical part and one end portion whose diameter is larger than that of the cylindrical part, and the one end portion of the conical spring is made to abut against the bottom surface of the recessed portion, while the other end portion of the conical spring is made to abut against the head of the reference bolt.

According to the above-described construction, since the remaining portion other than the one end portion of the conical spring is formed in the cylindrical shape of the same diameter, that cylindrical portion can be compressed uniformly to reliably position the actuator base resiliently.

In the invention according to the third aspcet, an outside diameter of the one end portion of the conical spring may be set to be identical to or slightly smaller than a diameter of the bottom surface of the recessed portion.

According to the above-described construction, the one end portion of the conical spring is prevented from being fitted in the gap between the inner peripheral wall defining the through hole of the housing and the peripheral wall of the reference bolt. Therefore, the actuator base can be horizontally moved and tilted smoothly, and the tilt adjustment of the objective lens can be effected precisely.

In the invention according to the third aspect, the outside diameter of the other end portion of the conical spring may be set to be identical to or slightly smaller than a diameter of the head of the reference bolt.

According to the above-described construction, the conical spring can be reliably compressed by the head of the reference bolt, making it possible to generate a tensile force, as desired.

DETAILED DESCRIPTION OF THE PREFFERED EMBODIMENTS

FIGS. 1 to 4 show an optical pickup 2 in accordance with a first embodiment of the invention. A conventionally required washer 26 (see FIG. 10) is omitted, and a conical spring 28 having a large diameter at one end portion 28a thereof and a small diameter at the other end portion 28b thereof is interposed between a bottom surface 23a of a recessed portion 23 and a head 21a of a reference bolt 21. Since the other arrangements are substantially similar to those shown in FIGS. 7 to 10, identical portions are denoted by the same reference numerals, and a description thereof will be omitted.

According to the above-described construction, even if the one end portion 28a of the conical spring 28 interposed between the bottom surface 23a of the recessed portion 23 and the head 21a of the reference bolt 21 bites into the bottom surface 23a, since the one end portion 28a of the conical spring 28 is formed in the large-diameter shape, the conical spring 28 is deflected appropriately and allows the movement of the reference bolt 21. Hence, the horizontal movement and tilting of the actuator base 11 is not hindered, and the tilt adjustment of an objective lens OL can be effected easily. In addition, since the washer 26 is omitted between the bottom surface 23a of the recessed portion 23 and the head 21a of the conical spring 28, the fabrication cost can be lowered by the omitted portion.

Figure 1:
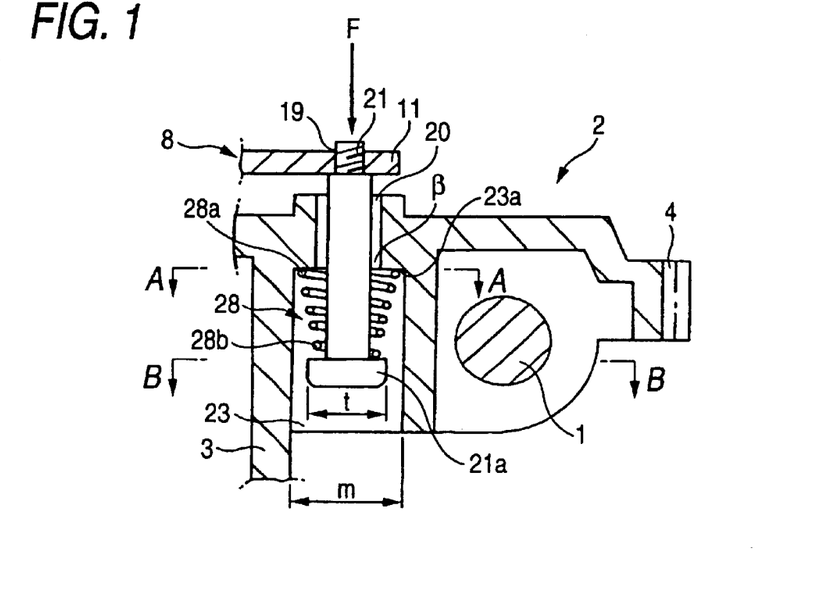
FIG. 1 is a vertical cross-sectional view partially illustrating an optical pickup in accordance with a first embodiment of the invention.
Figure 2:
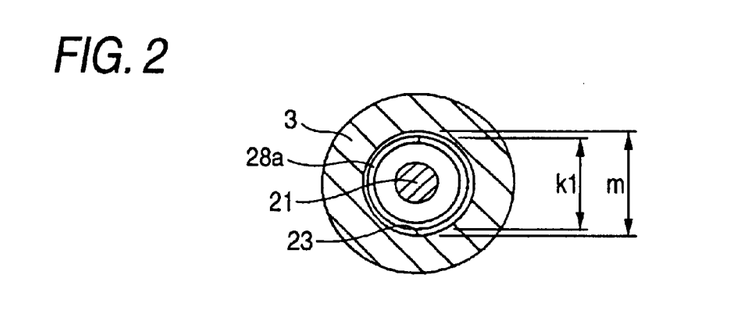
FIG. 2 is a view taken in the direction of arrows along line A—A of FIG. 1.
Figure 3:
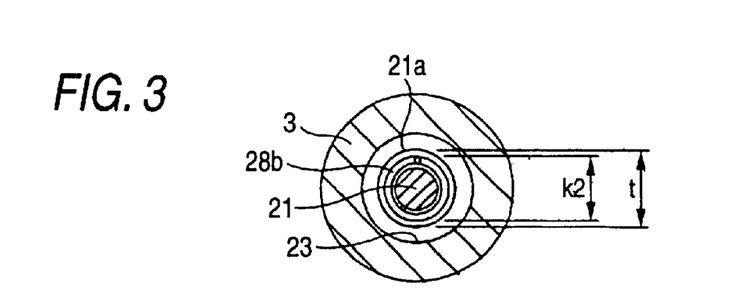
FIG. 3 is a view taken in the direction of arrows along line B—B of FIG. 1.
Figure 4:
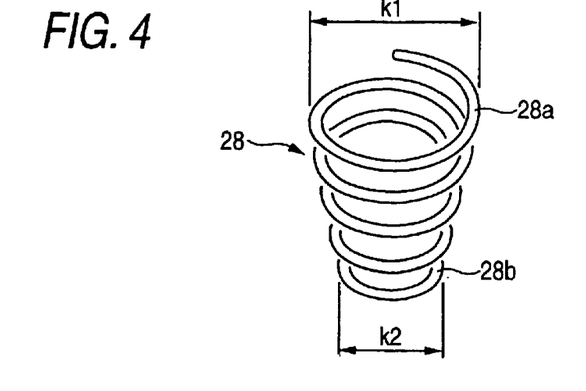
FIG. 4 is a perspective view of a conical spring shown in FIG. 1.

The aforementioned conical spring 28 is formed in a tapered shape, and the outside diameter k1 of its one end portion 28a is set to be identical to or slightly smaller than the diameter m of the bottom surface 23a of the recessed portion 23, while the outside diameter k2 of its other end portion 28b is set to be identical to or slightly smaller than the diameter t of the head 21a of the reference bolt 21.

For example, the outside diameter k1 of the conical spring 28 may be 0.2 to 0.4 mm smaller than the diameter m of the bottom surface 23a of the recessed portion 23.

The outside diameter k2 may be set slightly larger than the diameter t of the head 21a of the reference bolt 21 in a manner that the head 21a does not fall into the conical spring 28.

According to the above-described construction, since the conical spring 28 is formed in the tapered shape, and the conical spring 28 is resiliently deformed uniformly as a whole to return a reference bolt 22 to its central portion, the actuator base 11 can be horizontally moved and tilted smoothly. In addition, since the outside diameter k1 of the one end portion 28a of the conical spring 28 is set to be identical to or slightly smaller than the diameter m of the bottom surface 23a of the recessed portion 23, the one end portion 28a of the conical spring 28 is prevented from being fitted in a gap β between the inner peripheral wall defining a through hole 20 and the peripheral wall of the reference bolt 21. Therefore, the actuator base 11 can be horizontally moved and tilted smoothly, and the tilt adjustment of the objective lens OL can be effected precisely. Moreover, since the outside diameter k2 of the other end portion 28b of the conical spring 28 is set to be identical to or slightly smaller than the diameter t of the head 21a of the reference bolt 21, the conical spring 28 can be reliably compressed by the head 21a of the reference bolt 21, making it possible to generate a tensile force F, as desired.

Figure 5:
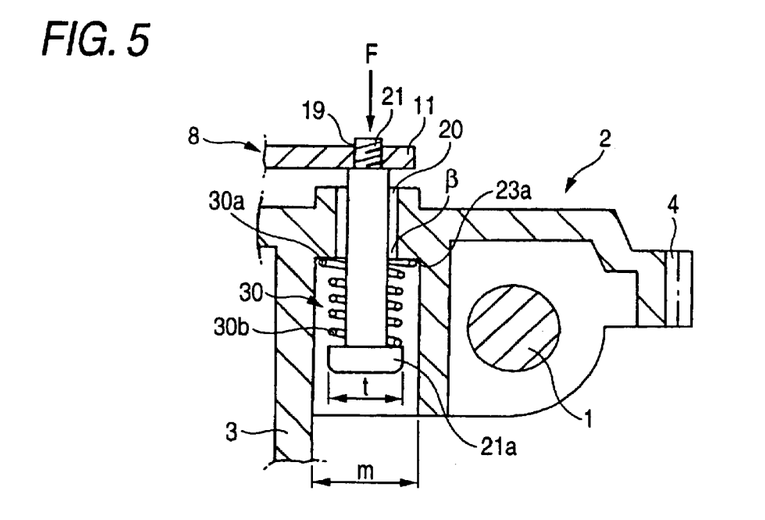
FIG. 5 is a vertical cross-sectional view partially illustrating an optical pickup in accordance with a second embodiment of the invention.
Figure 6:
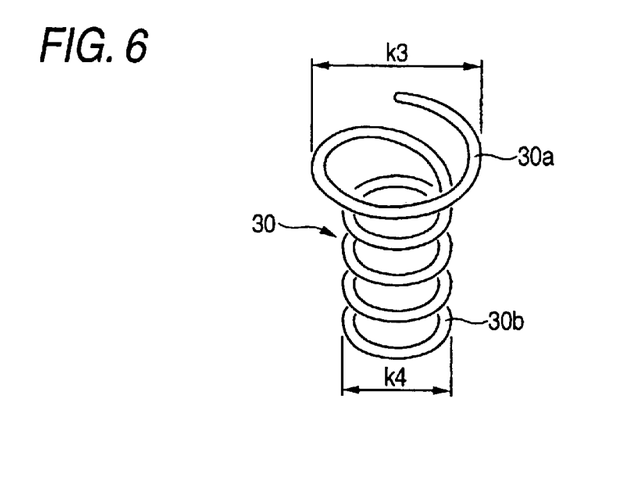
FIG. 6 is a perspective view of a conical spring shown in FIG. 5.

FIGS. 5 and 6 partially show an optical pickup 2 in accordance with a second embodiment of the invention. The conventionally required washer 26 (see FIG. 10) is omitted, and a conical spring 30 having a large diameter only at one end portion 30a thereof and a small diameter at a remaining portion thereof is interposed between the bottom surface 23a of the recessed portion 23 and the head 21a of the reference bolt 21. The one end portion 30a of the conical spring 30 is made to abut against the bottom surface 23a of the recessed portion 23, while the other end portion 30b of the conical spring 30 is made to abut against the head 21a of the reference bolt 21. Since the other arrangements are substantially similar to those shown in FIGS. 1 to 4, identical portions are denoted by the same reference numerals, and a description thereof will be omitted.

According to the above-described construction, even if the one end portion 30a of the conical spring 30 interposed between the bottom surface 23a of the recessed portion 23 and the head 21a of the reference bolt 21 bites into the bottom surface 23a, since the one end portion 30a of the conical spring 30 is formed in the large-diameter shape, the conical spring 30 is deflected appropriately and allows the movement of the reference bolt 21. Hence, the horizontal movement and tilting of the actuator base 11 is not hindered, and the tilt adjustment of an objective lens OL can be effected easily. In addition, since the washer 26 is omitted between the bottom surface 23a of the recessed portion 23 and the head 21a of the conical spring 30, the fabrication cost can be lowered by the omitted portion.

The aforementioned conical spring 30 is formed in a substantially cylindrical shape in which the diameter of only the one end portion 30a is provided with a large diameter. Further, the outside diameter k3 of its one end portion 30a is set to be identical to or slightly smaller than the diameter m of the bottom surface 23a of the recessed portion 23, while the outside diameter k4 of the remaining portion other than the one end portion 30a is set to be identical to or slightly smaller than the diameter t of the head 21a of the reference bolt 21.

According to the above-described construction, since the outside diameter k3 of the one end portion 30a of the conical spring 30 is set to be identical to or slightly smaller than the diameter m of the bottom surface 23a of the recessed portion 23, the one end portion 30a of the conical spring 30 is prevented from being fitted in the gap β between the inner peripheral wall defining the through hole 20 and the peripheral wall of the reference bolt 21. Therefore, the actuator base 11 can be horizontally moved and tilted smoothly, and the tilt adjustment of the objective lens OL can be effected precisely. Moreover, since the outside diameter k4 of the remaining portion other than the one end portion 30a of the conical spring 30 is set to be identical to or slightly smaller than the diameter t of the head 21a of the reference bolt 21, the conical spring 30 can be reliably compressed by the head 21a of the reference bolt 21, making it possible to generate the tensile force F, as desired.

In accordance with the first aspect of the invention, even if the one end portion of the conical spring interposed between the bottom surface of the recessed portion and the head of the reference bolt bites into the bottom surface, since the one end portion of the conical spring is formed in the large-diameter shape, the conical spring is deflected appropriately and allows the movement of the reference bolt. Hence, the horizontal movement and tilting of the actuator base is not hindered, and the tilt adjustment of an objective lens can be effected easily. In addition, since the washer is omitted between the bottom surface of the recessed portion and the head of the conical spring, the fabrication cost can be lowered by the omitted portion.

In addition, since the conical spring is formed in the tapered shape, and the conical spring is resiliently deformed uniformly as a whole to return the reference bolt to its central portion, the actuator base can be horizontally moved and tilted smoothly.

Furthermore, since the outside diameter of the one end portion of the conical spring is set to be identical to or slightly smaller than the diameter of the bottom surface of the recessed portion, the one end portion of the conical spring is prevented from being fitted in the gap between the inner peripheral wall defining a through hole of the housing and the peripheral wall of the reference bolt. Therefore, the actuator base can be horizontally moved and tilted smoothly, and the tilt adjustment of the objective lens can be effected precisely. Moreover, since the outside diameter of the other end portion of the conical spring is set to be identical to or slightly smaller than the diameter of the head of the reference bolt, the conical spring can be reliably compressed by the head of the reference bolt, making it possible to generate a tensile force, as desired.

In accordance with the second aspect of the invention, even if the one end portion of the conical spring interposed between the bottom surface of the recessed portion and the head of the reference bolt bites into the bottom surface, since the one end portion of the conical spring is formed in the large-diameter shape, the conical spring is deflected appropriately and allows the movement of the reference bolt. Hence, the horizontal movement and tilting of the actuator base is not hindered, and the tilt adjustment of an objective lens can be effected easily. In addition, since the washer is omitted between the bottom surface of the recessed portion and the head of the conical spring, the fabrication cost can be lowered by the omitted portion.

In addition, since the remaining portion other than the one end portion of the conical spring is formed in the cylindrical shape of the same diameter, that cylindrical portion can be compressed uniformly to reliably position the actuator base resiliently.

Furthermore, since the outside diameter of the one end portion of the conical spring is set to be identical to or slightly smaller than the diameter of the bottom surface of the recessed portion, the one end portion of the conical spring is prevented from being fitted in the gap between the inner peripheral wall defining the through hole of the housing and the peripheral wall of the reference bolt.

Therefore, the actuator base can be horizontally moved and tilted smoothly, and the tilt adjustment of the objective lens can be effected precisely. Moreover, since the outside diameter of the remaining portion other than the one end portion of the conical spring is set to be identical to or slightly smaller than the diameter of the head of the reference bolt, the conical spring can be reliably compressed by the head of the reference bolt, making it possible to generate a tensile force, as desired.

In accordance with the third aspect of the invention, even if the one end portion of the conical spring interposed between the bottom surface of the recessed portion and the head of the reference bolt bites into the bottom surface, since the one end portion of the conical spring is formed in the large-diameter shape, the conical spring is deflected appropriately and allows the movement of the reference bolt. Hence, the horizontal movement and tilting of the actuator base is not hindered, and the tilt adjustment of an objective lens can be effected easily. In addition, since the washer is omitted between the bottom surface of the recessed portion and the head of the conical spring, the fabrication cost can be lowered by the omitted portion.

In accordance with a fourth aspect of the invention, since the conical spring is formed in the tapered shape, and the conical spring is resiliently deformed uniformly as a whole to return the reference bolt to its central portion, the actuator base can be horizontally moved and tilted smoothly.

In accordance with a fifth aspect of the invention, since the remaining portion other than the one end portion of the conical spring is formed in the cylindrical shape of the same diameter, that cylindrical portion can be compressed uniformly to reliably position the actuator base resiliently.

In accordance with a sixth aspect of the invention, the one end portion of the conical spring is prevented from being fitted in the gap between the inner peripheral wall defining the through hole of the housing and the peripheral wall of the reference bolt. Therefore, the actuator base can be horizontally moved and tilted smoothly, and the tilt adjustment of the objective lens can be effected precisely.

In accordance with a seventh aspect of the invention, the conical spring can be reliably compressed by the head of the reference bolt, making it possible to generate a tensile force, as desired.

What is claimed is:

1. An optical pickup comprising:
   a housing having a through hole for a reference bolt, a recessed portion formed concentric with the through hole for a reference bolt and through holes for tilt adjusting bolts;
   a reference bolt to be inserted in the through hole for a reference bolt, the reference bolt having a head;
   two tilt adjusting bolts to be inserted in the through holes for tilt adjusting bolts;
   an actuator base attached to an end face of the housing by the reference bolt and the tilt adjusting bolts;
   a lens holder holding an objective lens, the lens holder is supported on the actuator base; and
   a tapered conical spring interposed between the recessed portion and the head of the reference bolt, the tapered conical spring having one end portion whose outside diameter is set to be identical to or slightly smaller than a diameter of a bottom surface of the recessed portion and another end portion whose outside diameter is set to be smaller than the outside diameter of the one end portion and identical to or slightly smaller than a diameter of the head of the reference bolt,
   wherein the one end portion of the tapered conical spring is made to abut against the bottom surface of the recessed portion instead of abutting against a washer, while the other end portion of the tapered conical spring is made to abut against the head of the reference bolt, thereby urging the actuator base toward the end face of the housing, and
   each of the tilt adjusting bolts are operated against a spring force of the tapered conical spring so as to align an optical axis of the objective lens with an optical axis of laser light.

2. An optical pickup comprising:
   a housing having a through hole for a reference bolt, a recessed portion formed concentric with the through hole for a reference bolt and through holes for tilt adjusting bolts;
   a reference bolt to be inserted in the through hole for a reference bolt, the reference bolt having a head;
   two tilt adjusting bolts to be inserted in the through holes for tilt adjusting bolts;
   an actuator base attached to an end face of the housing by the reference bolt and the tilt adjusting bolts;
   a lens holder holding an objective lens, the lens holder is supported on the actuator base; and
   a conical spring interposed between the recessed portion and the head of the reference bolt, the conical spring having one end portion whose outside diameter is set to be identical to or slightly smaller than a diameter of a bottom surface of the recessed portion and a remaining portion whose outside diameter is set to be smaller than the outside diameter of the one end portion and identical to or slightly smaller than a diameter of the head of the reference bolt,
   wherein the one end portion of the conical spring is made to abut against the bottom surface of the recessed portion instead of abutting against a washer, while the other end portion of the conical spring is made to abut against the head of the reference bolt, thereby urging the actuator base toward the end face of the housing, and
   each of the tilt adjusting bolts are operated against a spring force of the tapered conical spring so as to align an optical axis of the objective lens with an optical axis of laser light.

3. An optical pickup comprising:
   a housing having a through hole for a reference bolt, a recessed portion formed concentric with the through hole for a reference bolt and through holes for tilt adjusting bolts;
   a reference bolt to be inserted in the through hole for a reference bolt, the reference bolt having a head;
   two tilt adjusting bolts to be inserted in the through holes for tilt adjusting bolts;
   an actuator base attached to an end face of the housing by the reference bolt and the tilt adjusting bolts;
   a lens holder holding an objective lens, the lens holder is supported on the actuator base; and
   a conical spring interposed between the recessed portion and the head of the reference bolt,
   wherein one end portion of the conical spring having a large diameter is made to abut against a bottom surface of the recessed portion, while the other end portion of the conical spring having a small diameter is made to abut against the head of the reference bolt, thereby urging the actuator base toward the end face of the housing, and each of the tilt adjusting bolts are operated against a spring force of the conical spring so as to align an optical axis of the objective lens with an optical axis of laser light.

4. The optical pickup according to claim 3, wherein the conical spring is formed in a tapered shape, and the one end portion of the tapered conical spring is made to abut against the bottom surface of the recessed portion, while the other end portion of the tapered conical spring is made to abut against the head of the reference bolt.

5. The optical pickup according to claim 3, wherein the conical spring has a cylindrical part and one end portion whose diameter is larger than that of the cylindrical part, and the one end portion of the conical spring is made to abut against the bottom surface of the recessed portion, while the other end portion of the conical spring is made to abut against the head of the reference bolt.

6. The optical pickup according to claim 3, wherein an outside diameter of the one end portion of the conical spring is set to be identical to or slightly smaller than a diameter of the bottom surface of the recessed portion.

7. The optical pickup according to claim 3, wherein an outside diameter of the other end portion of the conical spring is set to be identical to or slightly smaller than a diameter of the head of the reference bolt.

8. The optical pickup according to claim 6, wherein the outside diameter of the one end portion of the conical spring is set to be 0.2 to 0.4 mm smaller than the diameter of the bottom surface of the recessed portion.

* * * * *